United States Patent
Murthy (10) Patent No.: US 10,585,660 B2
(45) Date of Patent: Mar. 10, 2020

(54) REDUCING BUFFER OVERFLOW

(71) Applicant: FUJITSU LIMITED, Kawasaki-shi, Kanagawa (JP)

(72) Inventor: Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/005,512

(22) Filed: Jun. 11, 2018

(65) Prior Publication Data

US 2019/0377565 A1 Dec. 12, 2019

(51) Int. Cl.
*G06F 21/57* (2013.01)
*G06F 8/65* (2018.01)

(52) U.S. Cl.
CPC .............. *G06F 8/65* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 6,578,094 B1 * | 6/2003 | Moudgill | G06F 7/785 710/57 |
| 8,037,529 B1 | 10/2011 | Chiueh et al. | |
| 9,552,284 B2 | 1/2017 | Copos et al. | |
| 9,772,931 B2 | 9/2017 | Copos et al. | |
| 10,164,848 B1 * | 12/2018 | Chen | G06F 11/3684 |
| 2008/0052468 A1 * | 2/2008 | Speirs | G06F 13/4059 711/132 |
| 2011/0219454 A1 * | 9/2011 | Lee | G06F 16/00 726/25 |
| 2012/0317647 A1 * | 12/2012 | Brumley | G06F 21/00 726/25 |
| 2014/0380474 A1 * | 12/2014 | Paithane | H04L 63/145 726/23 |
| 2016/0179586 A1 * | 6/2016 | Wang | G06F 9/528 711/125 |
| 2016/0259711 A1 | 9/2016 | Murthy | |
| 2018/0004635 A1 | 1/2018 | Murthy | |

OTHER PUBLICATIONS

Cha et al., "Unleashing Mayhem on Binary Code," in Proceedings of the 2012 IEEE Symposium on Security and Privacy, Washington, DC, USA, 2012, pp. 380-394.

(Continued)

*Primary Examiner* — Daxin Wu
(74) *Attorney, Agent, or Firm* — Maschoff Brennan (57) ABSTRACT

A method may include operating a program using an input that causes buffer overflow and determining minimum input length that causes buffer overflow and maximum input length that does not cause buffer overflow. The method may include operating program using first input that includes the maximum input length and second input that includes the minimum input length. The method may include collecting call/return pairs for each function of the program using the first and second input and determining, based on a difference between call/return pairs, a function that causes buffer overflow. The method may include determining whether a number of calls exceeds a threshold. In response to the number of calls exceeding the threshold, the method may include inserting a patch configured to prevent buffer overflow in a calling function.

20 Claims, 5 Drawing Sheets

(56) References Cited

OTHER PUBLICATIONS

Avgerinos et al. "AEG: Automatic Exploit Generation" NDSS Symposium, Feb. 7, 2011.
J. H. Perkins et al., "Automatically Patching Errors in Deployed Software," in Proceedings of the ACM SIGOPS 22Nd Symposium on Operating Systems Principles, New York, NY, USA, 2009, pp. 87-102.
Manish Prasad and Tzi-cker Chiueh, "A Binary Rewriting Defense Against Stack based Buffer Overflow Attacks.," in USENIX Annual Technical Conference, 2003.
Park et al. "The Dynamic Buffer Overflow Detection and Prevention Tool for Windows Executables Using Binary Rewriting," in The 9th International Conference on Advanced Communication Technology, 2007, vol. 3, pp. 1776-1781.
Chen et al. "StackArmor: Comprehensive Protection from Stack-based Memory Error Vulnerabilities for Binaries" NDSS Symposium, Feb. 8, 2015.

\* cited by examiner

REDUCING BUFFER OVERFLOW

FIELD

The embodiments discussed in the present disclosure are related to reducing buffer overflow.

BACKGROUND

Overflow of data intended for a buffer into a return address portion or another portion of a memory stack (e.g., buffer overflow) may cause a program and/or a function of the program to operate improperly. Additionally, buffer overflow may expose security deficiencies, which may cause security of the program and/or electronic devices in communication with the program to be compromised.

The subject matter claimed in the present disclosure is not limited to embodiments that solve any disadvantages or that operate only in environments such as those described. Rather, this background is only provided to illustrate one example technology area where some embodiments described in the present disclosure may be practiced.

SUMMARY

According to an aspect of an embodiment, a method may include operating a program using an input that includes a particular input length that causes a buffer to overflow. The method may also include determining a minimum input length that causes the buffer to overflow and a maximum input length that does not cause the buffer to overflow. The method may additionally include operating the program using a first input that includes the maximum input length and a second input that includes the minimum input length. The method may include collecting call/return pairs for each function of the program using the first input and the second input. The method may also include determining a particular function that causes the buffer to overflow. The particular function may be determined based on a difference between the call/return pairs for the first input and the call/return pairs for the second input. The method may additionally include determining whether a number of calls to the particular function exceeds a call threshold value. In response to the number of calls to the particular function exceeding the call threshold value, the method may include inserting a patch in a calling function of the program. The patch may include a bound configured to prevent the particular function from causing the buffer to overflow.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

all arranged in accordance with at least one embodiment described in the present disclosure.

DESCRIPTION OF EMBODIMENTS

In some instances, automatically detecting buffer overflow (e.g., stack buffer overrun) and patching a function (e.g., a subroutine) that causes the buffer overflow may increase functionality of the program and/or remove security deficiencies associated with the function and/or the program. According to some embodiments, automatically detecting and patching the function may be performed by a computing device that includes an overflow detection module (ODM) and a patch module.

In some embodiments, the computing device may receive input data and operate a program using the input data. The input data may include an input length that causes a particular function of the program to overflow a buffer. Buffer overflow may occur when input data includes an input length that causes data stored in a stack to exceed memory space allocated to the buffer in the stack. Overflow of the buffer may write over a return address portion in the stack, which may corrupt the return to calling functions and/or calling of other functions. Corrupting the return to calling functions and/or calling of other functions may cause the program to operate improperly (e.g., crash) when the program accesses the particular function and attempts to return to the calling function using the corrupt return address portion in the stack.

According to some embodiments, the ODM may detect the buffer overflow in machine code (e.g., binary code) and/or assembly language corresponding to the program and/or the particular function. The ODM may determine a maximum input length that does not cause buffer overflow and a minimum input length that causes buffer overflow. The ODM may operate the program using a first input that includes the maximum input length and a second input that includes the minimum input length. Call/return pairs corresponding to both the first input and the second input may be collected and stored in a memory. The call/return pairs may be collected and stored in assembly language corresponding to the function. The ODM may determine a function call sequence leading up to the particular function corresponding to the first input and the second input. The function call sequence may be determined by comparing the call/return pairs for the first input to the second input. Additionally, the ODM may determine the function call sequence leading up to the particular function that causes buffer overflow.

In some embodiments, the ODM may analyze allocation of memory in a first stack corresponding to the first input. The ODM may also analyze allocation of memory in a second stack corresponding to the second input. The ODM may analyze allocation of memory in the first stack and/or the second stack in assembly language. The first stack may be compared to the second stack and the return address portion that is corrupted may be determined based on a difference between the first stack and the second stack.

Additionally, the ODM may determine stack locations that correspond to the return address portion and the buffer.

According to some embodiments, the patch module may generate multiple fuzzed inputs. The fuzzed inputs may be generated based on the first input or any other input that causes the program to call the particular function. Additionally, the patch module may operate the program using the fuzzed inputs. A number of calls to the particular function operating in the program using the fuzzed inputs may be collected and stored in the memory. The number of calls to the particular function may be compared to a call threshold value. If the numbers of calls to the particular function exceeds the call threshold value, the patch module may insert a patch that includes a bound configured to prevent the particular function from causing the buffer to overflow in the calling function that called the particular function. If the number of calls to the particular function does not exceed the call threshold, the patch module may insert the patch in the particular function.

In some embodiments, the patch module may insert the patch in assembly language corresponding to the calling function or the particular function (e.g., hot patching). In other embodiments, the patch module may lift the assembly language to intermediate representation and the patch module may insert the patch in the intermediate representation corresponding to the calling function or the particular function.

Automatically detecting and patching a function that causes buffer overflow may improve functionality of a computing device by reducing and/or preventing security risks of programs and/or electronic devices. Additionally, automatically detecting and patching a function that causes buffer overflow may improve functionality of a computing device by reducing time between discovering a buffer overflow and resolving the buffer overflow.

Embodiments of the present disclosure are explained with reference to the accompanying drawings.

Figure 1:
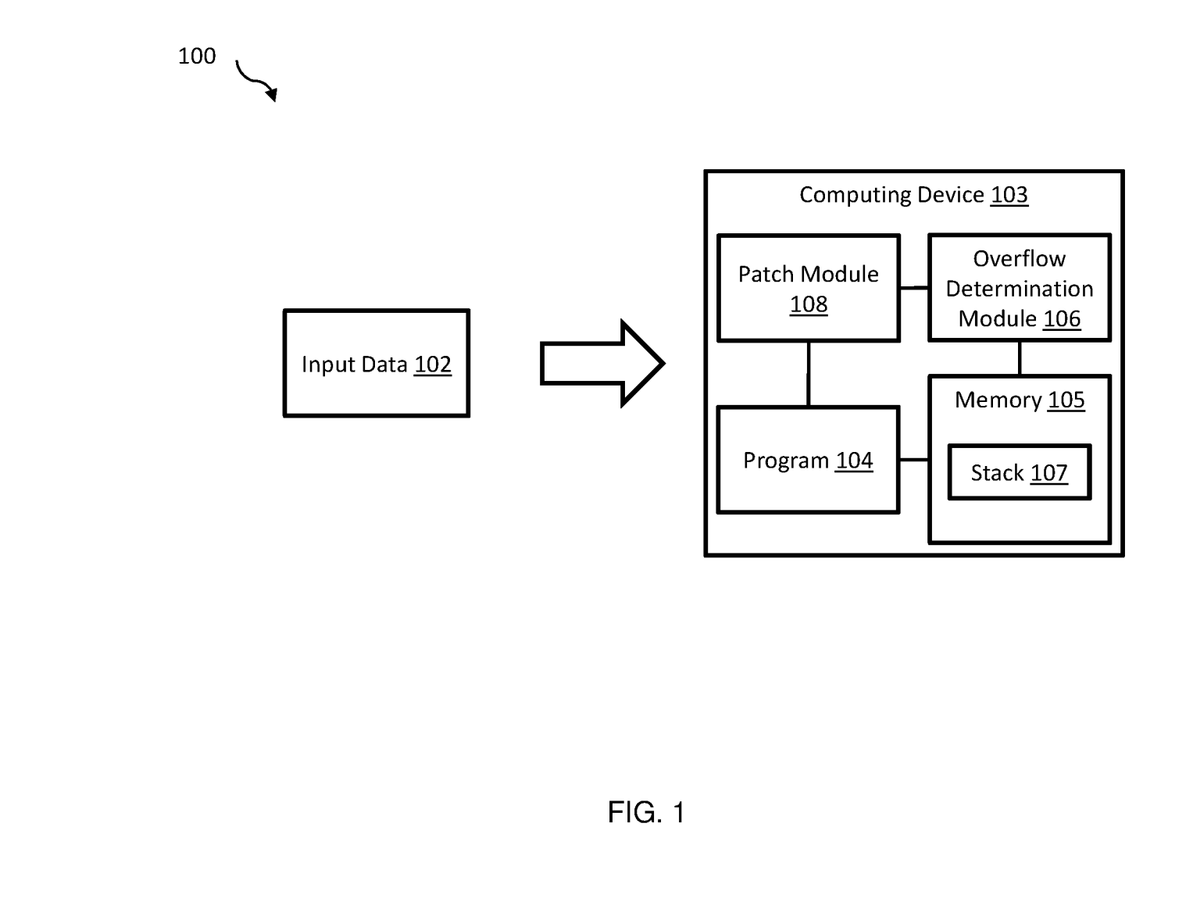
FIG. 1 illustrates an example environment related to operating a program, determining whether an overflow of a buffer in a stack occurred, and patching the program to reduce and/or prevent buffer overflow.

FIG. 1 illustrates an example environment 100 related to operating a program 104, determining whether an overflow of a buffer in a stack 107 occurred, and patching the program 104 to reduce and/or prevent buffer overflow (e.g., during subsequent operation of program 104), arranged in accordance with at least embodiment disclosed in the present disclosure.

The environment 100 may include a computing device 103. The computing device 103 may include the program 104, an overflow determination module 106 (herein ODM 106'), a memory 105, and a patch module 108. The memory 105 may store the memory stack 107 including the buffer. Although illustrated as including a single stack 107 in FIG. 1, the memory 105 may include any number of stacks configured to, individually or collectively, perform or direct performance of any number of operations described in the present disclosure.

The computing device 103 may include a computer-based hardware device that includes a processor (not illustrated in FIG. 1), the memory 105, and communication capabilities. Some examples of the computing device 103 may include a mobile phone, a smartphone, a tablet computer, a laptop computer, a desktop computer, a set-top box, a virtual-reality device, or a connected device, etc. The computing device 103 may include a processor-based computing device. For example, the computing device 103 may include a hardware server or another processor-based computing device configured to function as a server. The computing device 103 may include memory and network communication capabilities.

The computing device 103 may be configured to receive an input data 102. The computing device 103 may also be configured to determine whether the input data 102 caused one or more functions of the program 104 to overflow the buffer and write over a return address portion of the stack 107. If one or more functions caused the buffer to overflow, the computing device 103 may generate a patch and insert the patch in assembly language and/or intermediate representation corresponding to either the one or more functions or a calling function of the program 104.

The memory 105 may include any memory or data storage. In some embodiments, the memory 105 may include computer-readable storage media for carrying or having computer-executable instructions or data structures stored thereon. The computer-readable storage media may include any available media that may be accessed by a general-purpose or special-purpose computer, such as a processor. For example, the memory 105 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause a processor to perform a certain operation or group of operations.

The program 104 may include code and routines for performing one or more particular tasks. The ODM 106 may include code and routines configured to perform the various functionalities of the ODM 106 disclosed in the present disclosure. Additionally or alternatively, the ODM 106 may be implemented using hardware including a processor, a microprocessor (e.g., to perform or control performance of one or more operations), a field-programmable gate array (FPGA), or an application-specific integrated circuit (ASIC). In some other instances, the ODM 106 may be implemented using a combination of hardware and software.

The patch module 108 may include code and routines configured to perform the various functionalities disclosed in the present disclosure. Additionally or alternatively, the patch module 108 may be implemented using hardware including a processor, a microprocessor (e.g., to perform or control performance of one or more operations), an FPGA, or an ASIC. In some other instances, the patch module 108 may be implemented using a combination of hardware and software.

In the present disclosure, operations described as being performed by the ODM 106 and/or the patch module 108 may include those that the ODM 106 and/or the patch module 108 may direct a corresponding device or system to perform.

The program 104 may be configured to operate and perform one or more particular tasks using the input data 102. The input data 102 may include an input length. The input length may be measured by a number of digits, types of digits, values associated with the digits, number of bits, number of bytes, or any other appropriate unit of measurement.

The program 104 may read from and write to the memory 105 including the stack 107 during operation. The memory 105 is illustrated as including a single stack 107 in FIG. 1, it is understood that the memory 105 may include more than one stack 107. Temporary data and/or dynamically allocated data used and/or generated during operation of the program 104 may be read from or written to the buffer.

An example program (herein 'strcpy program') in which buffer overflow may occur may include:

```
# include <stdio.h>
# include <stdlib.h>
void bar(char* buf, char *s) {
    strcpy(buf, s);
    printf("%s!n", buf);
}
void foo(char* dst, char* src) {
    bar(dst, src);
}
Int main(int argc, char** argv) {
    if (argc <2) {
        printf("Usage: % s [arg]\n", argv[0]);
        exit(1)
    }
    char buf[10];
    foo(buf, argv[1]);
    return 0;
}
```

The buffer overflow may occur in the strcpy function of the program.

For example, a portion of the strcpy program in assembly language may include:

gdb-peda$ disas main
Dump of assembler code for function main:
0x080484c4 <+0>: push ebp
0x080484c5 <+1>: mov ebp,esp
0x080484c7 <+3>: and esp,0xfffffff0
0x080484ca <+6>: sub esp,0x20
0x080484cd <+9>: cmp DWDRD PTR [ebp+0x8], 0x1
0x080484d1 <+13>: jg 0x80484f4
0x080484d3 <+15>: mov eax,DWORD PTR [ebp+0xc]
0x080484d6 <+18>: mov eax,DWORD PTR [eax]
0x080484d8 <+20>: mov DWORD PTR [esp+0x4],eax
0x080484dc <+24>: mov DWORD PTR [esp], 0x80485b5
0x080484e3 <+31>: call 0x8048330
0x080484e8 <+36>: mov DWORD PTR [esp],0x1
0x080484ef <+43>: call 0x8048360
0x080484f4 <+48>: mov eax,DWORD PTR [ebp+0xc]
0x080484f7 <+51>: add eax,0x4
0x080484fa <+54>: mov eax,DWORD PTR [eax]
0x080484fc <+56>: mov DWORD PTR [esp+0x4],eax
0x08048500 <+60>: lea eax,[esp+0x16]
0x08048504 <+64>: mov DWORD PTR [esp],eax
0x08048507 <+67>: call 0x80484aa
0x0804850c <+72>: mov eax,0x0
0x08048511 <+77>: leave
0x08048512 <+78>: ret
End of assembler dump.
gdb-peda$ disas foo
Dump of assembler code for function foo:
0x080484aa <+0>: push ebp
0x080484ab <+1>: mov ebp,esp
0x080484ad <+3>: sub esp,0x18
0x080484b0 <+6>: mov DWORD PTR [ebp+0xc]
0x080484b3 <+9>: mov DWORD PTR [esp+0x4],eax
0x080484b7 <+13>: mov eax,DWORD PTR [ebp+0x8]
0x080484ba <+16>: mov DWORD PTR [esp],eax
0x080484bd <+19>: call 0x804847d
0x080484c2 <+24>: leave
0x080484c3 <+25>: ret
End of assembler dump.
gdb-peda$ disas bar
Dump of assembler code for function bar:
0x0804847d <+0>: push ebp
0x0804847e <+1>: mov ebp,esp
0x08048480 <+3>: sub esp,0x18
0x08048483 <+6>: mov eax,DWORD PTR [ebp+0xc]
0x08048486 <+9>: mov DWORD PTR [esp+0x4],eax
0x0804848a <+13>: mov eax,DWORD PTR [ebp+0x8]
0x0804848d <+16>: mov DWORD PTR [esp],eax
0x08048490 <+19>: call 0x8048340
0x08048495 <+24>: mov eax,DWORD PTR [ebp+0x8]
0x08048498 <+27>: mov DWORD PTR [esp+0x4],eax
0x0804849c <+31>: mov DWORD PTR [esp], 0x80485b0
0x080484a3 <+38>: call 0x8048330
0x080484a8 <+43>: leave
0x080484a9 <+44>: ret
End of assembler dump.

In the assembly language, calling 0x8048340 may correspond to calling the strcpy function of the program.

The ODM 106 may monitor the buffer and/or the program 104 to determine whether a buffer overflow has occurred. The ODM 106 may detect overflow as described in U.S. Pat. Nos. 9,552,284; 9,772,931; U.S. patent application Ser. No. 14/792,507; and/or U.S. patent application Ser. No. 15/198,064, each of which are incorporated in the present disclosure in their entirety.

If a buffer overflow occurs, the ODM 106 may determine a maximum input length that does not cause the program 104 to overflow the buffer. In some embodiments, the maximum input length may be determined by incrementally reducing and/or increasing the input length of the input data 102 until the maximum input length that does not cause the program 104 to overflow the buffer is determined (e.g., determined using binary search). For example, the input length of the input data 102 that causes buffer overflow may be equal to eight bytes. The input length may be reduced by a first half step so that a second input length may be equal to four bytes. If the second input length also causes buffer overflow, the second input length may be reduced by a second half step so that a third input length may be equal to two bytes. If the third input length does not cause buffer overflow, the third input length may be increased by a third half step (e.g., half a size of the second half step) so that a fourth input length may be equal to three bytes. If the fourth input length causes buffer overflow, the maximum input length may be equal to the third input length (e.g., two bytes).

The ODM 106 may also determine a minimum input length that causes the program 104 to overflow the buffer. In some embodiments, the minimum input length may be equal to the maximum input length plus one unit of measurement. For example, if the unit of measurement is a number of bytes and the maximum input length is equal to two bytes, the minimum input length may be set equal to three bytes.

The ODM 106 may operate the program 104 using a first input that includes the minimum input length. A first set of call/return pairs generated during operation of the program 104 using the first input may be collected and stored in the memory 105. The ODM 106 may also operate the program 104 using a second input that includes the maximum input length. A second set of call/return pairs generated during operation of the program 104 using the second input may be collected and stored in the memory 105. The first set and second set of call/return pairs may be collected and/or stored in assembly language.

An example of call/return pairs generated using an example first input and an example second input in the strcpy program is provided in Table I:

TABLE I

| First Input | Second Input |
|---|---|
| call 0x80483b0 | call 0x80483b0 |
| retn 0x8047852b | retn 0x8047852b |
| call 0x80482f4 | call 0x80482f4 |
| call 0x80483b0 | call 0x80483b0 |
| retn 0x80482fd | retn 0x80482fd |
| retn 0x8048543 | retn 0x8048543 |
| call 0x8048450 | call 0x8048450 |
| retn 0x8048572 | retn 0x8048572 |
| retn 0x9000040 | retn 0x9000040 |
| call 0x80484aa | call 0x80484aa |
| call 0x804847d | call 0x804847d |
| call 0x8048340 | call 0x8048340 |
| call 0x8048330 | call 0x8048330 |
| retn 0x80484c2 | retn 0x80484c2 |
| retn 0x804850c | retn 0x804850c |
| retn 0x9000040 | retn 0x41414141 |

The ODM 106 may determine a particular function that causes the buffer overflow. In some embodiments, the ODM 106 may determine the particular function based on a difference between the first set of call/return pairs and the second set of call/return pairs. For example, as shown in Table I, calling 0x8048340 may correspond to calling the strcpy function. The value of retn 0x9000040 may correspond to the return value from the main( ) function using the first input. The value of retn 0x41414141 may correspond to the return value from the main( ) function that has been overwritten when using the second input. Since the retn values are different, the strcpy function is determined to be the particular function. As another example, both the first set and second set of call/return pairs may include eight call/return pairs and each call/return pair may be the same or similar except a third call/return pair may be different. The particular function may correspond to the function associated with the third call/return pair.

Additionally, the ODM 106 may determine a function call sequence of the program 104 leading up to calling the particular function using both the first input and the second input. In some embodiments, the ODM 106 may determine the particular function based on the difference between the function call sequence of the first input and the function call sequence of the second input. For example, the first two call/return pairs included in both the first set and second set of call/return pairs may be the same or similar and may be associated with a seventh function and a ninth function respectively. The ODM 106 may determine that the second call/return pair is the last call/return pair that is the same or similar between the two stacks and that the function call sequence leading up to calling the particular function may include the seventh function and the ninth function.

Additionally, a first stack corresponding to operating the program 104 using the first input and a second stack corresponding to operating the program 104 using the second input may be collected and/or stored in the memory 105. An example of a stack generated the strcpy program using the example first input and/or the second input is provided in Table II:

TABLE II

| ================ | Lower addr | |
|---|---|---|
| bar's locals | 0xffffda80 | <- esp |
| 0xffffdeb8 (foo ebp) | 0xffffda80 | <- foo's ebp |
| 0x080484c2 (ret) | 0xffffda9c | <- returns to foo() |
| foo's local | | |
| 0xffffdae8 (main ebp) | 0xffffdab8 | <- main's ebp |
| 0x0804850c (ret) | 0xffffdabc | <- return to main() |
| main's locals | | |
| buf[10] | 0xffffdabc | |
| 0x00 | 0xffffdae8 | <- the ebp whatever called main |
| 0xf7e2fad3 | 0xffffdae8 | <- return to somewhere |
| ================ | Higher addr | |

Furthermore, the ODM 106 may analyze allocation of memory in the first stack and in the second stack. In some embodiments, the ODM 106 may analyze allocation of memory in the first stack and/or the second stack in assembly language. The ODM 106 may compare the allocation of memory in the first stack to the allocation of memory in the second stack. Stack locations that correspond to return address portions and stack locations that correspond to buffers may be determined based on differences between the two stacks. The ODM 106 may determine which return address portion was corrupted during operation of the program 104 by comparing the various stack locations that correspond to return address portions in the first stack and the second stack.

The patch module 108 may generate multiple fuzzed inputs based on the first input. The fuzzed inputs may include randomized inputs and/or input lengths. The program 104 may be operated using each of the fuzzed inputs. Each time the program 104 is operated using the fuzzed inputs, the patch module 108 may determine whether the particular function was called. Each time the program 104 is operated, if the particular function was called, the patch module 108 may increment a number of calls to the particular function. Alternatively, if the particular function was not called, the program 104 may be operated using a different fuzzed input. This process may be repeated for each fuzzed input.

In some embodiments, the number of fuzzed inputs may be determined based on a minimum number of fuzzed inputs that call the particular function and/or a maximum number of times operating the program 104 using fuzzed inputs (e.g., a total number of fuzzed inputs). For example, the minimum number of fuzzed inputs that call the particular function may be equal to or greater than ten fuzzed inputs. As another example, the total number of times operating the program 104 using fuzzed inputs may be equal to or greater than seven hundred fifty. More specifically, the total number of times operating the program 104 using fuzzed inputs may be equal to one thousand. Additionally or alternatively, the number of fuzzed input may be determined based on a period of time that elapses while operating the program 104 using fuzzed inputs. For example, the number of fuzzed inputs may be equal to a number of times the program may be operated in an hour using fuzzed inputs. In some embodiments, the number of fuzzed inputs may be equal to a number of times the program may be operated in less than or more than an hour.

The patch module 108 may determine if the number of calls to the particular function exceeds a call threshold value. In some embodiments, a user may provide the call threshold value during setup/installation of the patch module 108. In other embodiments, the call threshold value may be equal to or greater than five percent of the total number of fuzzed inputs. Alternatively, the call threshold value may be less than five percent of the total number of fuzzed inputs. For example, if the total number of fuzzed inputs is equal to one hundred, the call threshold value may be equal to five. If the number of calls to the particular function exceeds the call threshold value, the patch module 108 may determine that the patch is to be inserted in a calling function of the program 104. If the number of calls does not exceed the call threshold value, the patch module 108 may determine that the patch is to be inserted in the particular function.

Inserting the patch in a calling function may prevent the particular function from being replaced if it can be called by other functions of the program 104 without overflowing the buffer. Inserting the patch in the particular function may prevent the particular function from overflowing the buffer due to a different function calling the particular function.

The patch module 108 may generate the patch based on whether the patch is to be inserted in the particular function or the calling function. A bound included in the patch may be based on the stack locations that correspond to the return address portions and the buffers of the first stack and the second stack. In some embodiments, a difference between the stack locations of the various portions in the stacks for the first input and the second input may be used to determine the bound included in the patch. For example, the patch module 108, in the strcpy program, may generate a strcpy 10 function that includes bound checking to replace the strcpy( ) function.

In some embodiments, the patch module 108 determine the stack locations that correspond to the return address portions and the buffers by monitoring each write to the first stack and/or the second stack and the corresponding stack location for each write. A number of values written in the first stack to the corresponding location may be compared a number of values written in the second stack to the corresponding location. The stack locations that are written to differently between the first and the second stack may indicate where the overflow occurred. In these embodiments, the bound may be based on a last stack location that is written to with the same information in the first stack and the second stack.

If the patch is inserted in the calling function, the function may be rewritten as a new function that includes the bound to prevent the particular function from causing the buffer to overflow. For example, the new function may be stored in an unused portion of the memory 105. In some embodiments, a new call in the calling function may replace the call to the particular function. For example, an instruction call for the particular function (e.g., <old_function_address>) may be replaced with a new instruction call for the new function (e.g., <new_function_address>). In the strcpy program, the patch module 108 may insert the patch (e.g., the strcpy_1( ) function) in bar( ) so that bar( ) calls the strcpy_1( ) function and not the strcpy( ) function.

If the patch is inserted in the particular function, a jump instruction (e.g., jmp) may be inserted at a beginning of the particular function. The jump instruction may instruct the program to access new code at a new location in the memory 105 when the particular function is called.

In some embodiments, the patch may be generated and inserted in assembly language representative of the calling function or the particular function. In other embodiments, the patch may be generated in intermediate representation representative of the calling function or the particular function. For example, the assembly language representative of the particular function may be lifted to intermediate representation. The assembly language and/or the intermediate representation including the patch may be converted to machine code for the computing device 103 to operate. In some embodiments, generating and inserting the patch in the assembly language may cause a larger processing penalty (e.g., decreased computer throughput and/or increased latency) than generating and inserting the patch in the intermediate representation.

Figure 2:
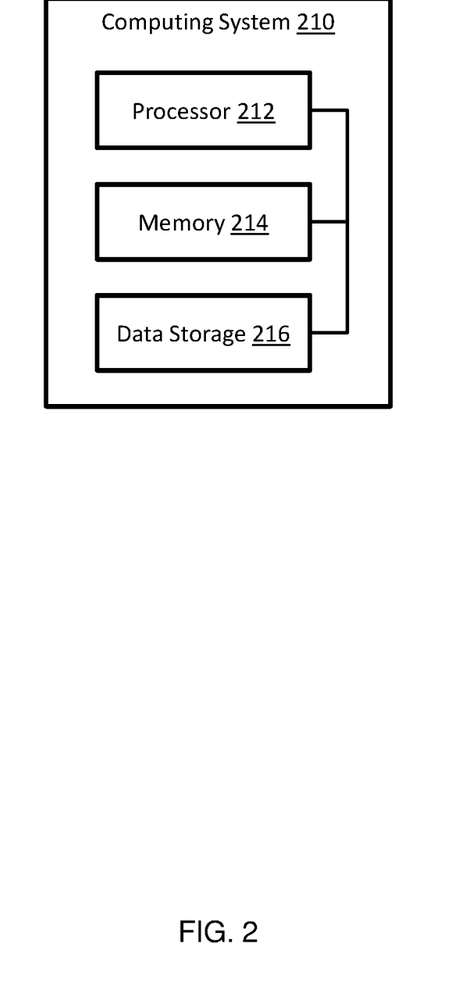
FIG. 2 illustrates an example computing system that may be configured to operate a program, determine whether an overflow of a buffer in a stack has occurred, and patch the program to reduce and/or prevent buffer overflow.

FIG. 2 illustrates an example computing system 210 that may be configured to operate a program, determine whether an overflow of a buffer in a stack has occurred, and patch the program to reduce and/or prevent buffer overflow (e.g., during subsequent operation of the program). The computing system 210 may be configured to implement or direct one or more operations associated with an ODM (e.g., the ODM 106 of FIG. 1), a patch module (e.g., the patch module 108 of FIG. 1), and/or a program (e.g., the program 104 of FIG. 1). The computing system 210 may include a processor 212, a memory 214, and a data storage 216. The processor 212, the memory 214, and the data storage 216 may be communicatively coupled, e.g., via a communication bus.

In general, the processor 212 may include any suitable special-purpose or general-purpose computer, computing entity, or processing device including various computer hardware or software modules and may be configured to execute instructions stored on any applicable computer-readable storage media. For example, the processor 212 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 212 may include any number of processors configured to, individually or collectively, perform or direct performance of any number of operations described in the present disclosure. Additionally, one or more of the processors may be present on one or more different electronic devices, such as different servers.

In some embodiments, the processor 212 may be configured to interpret and/or execute program instructions and/or process data stored in the memory 214, the data storage 216, or the memory 214 and the data storage 216. In some embodiments, the processor 212 may fetch program instructions from the data storage 216 and load the program instructions in the memory 214. After the program instructions are loaded into memory 214, the processor 212 may execute the program instructions.

For example, in some embodiments, the ODM, the patch module, and/or the program may be included in the data storage 216 as program instructions. The processor 212 may fetch the program instructions of the ODM, the patch module, and/or the program from the data storage 216 and may load the program instructions of the ODM, the patch module, and/or the program in the memory 214. After the program instructions of the ODM, the patch module, and/or the program are loaded into the memory 214, the processor 212 may execute the program instructions such that the computing system may implement the operations associated with the ODM, the patch module, and/or the program as directed by the instructions.

The memory 214 and the data storage 216 may include computer-readable storage media for carrying or having computer-executable instructions or data structures stored thereon. Such computer-readable storage media may include any available media that may be accessed by a general-purpose or special-purpose computer, such as the processor 212. By way of example, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 212 to perform a certain operation or group of operations.

Modifications, additions, or omissions may be made to the computing system 210 without departing from the scope of the present disclosure. For example, in some embodiments, the computing system 210 may include any number of other components that may not be explicitly illustrated or described.

Figure 3:
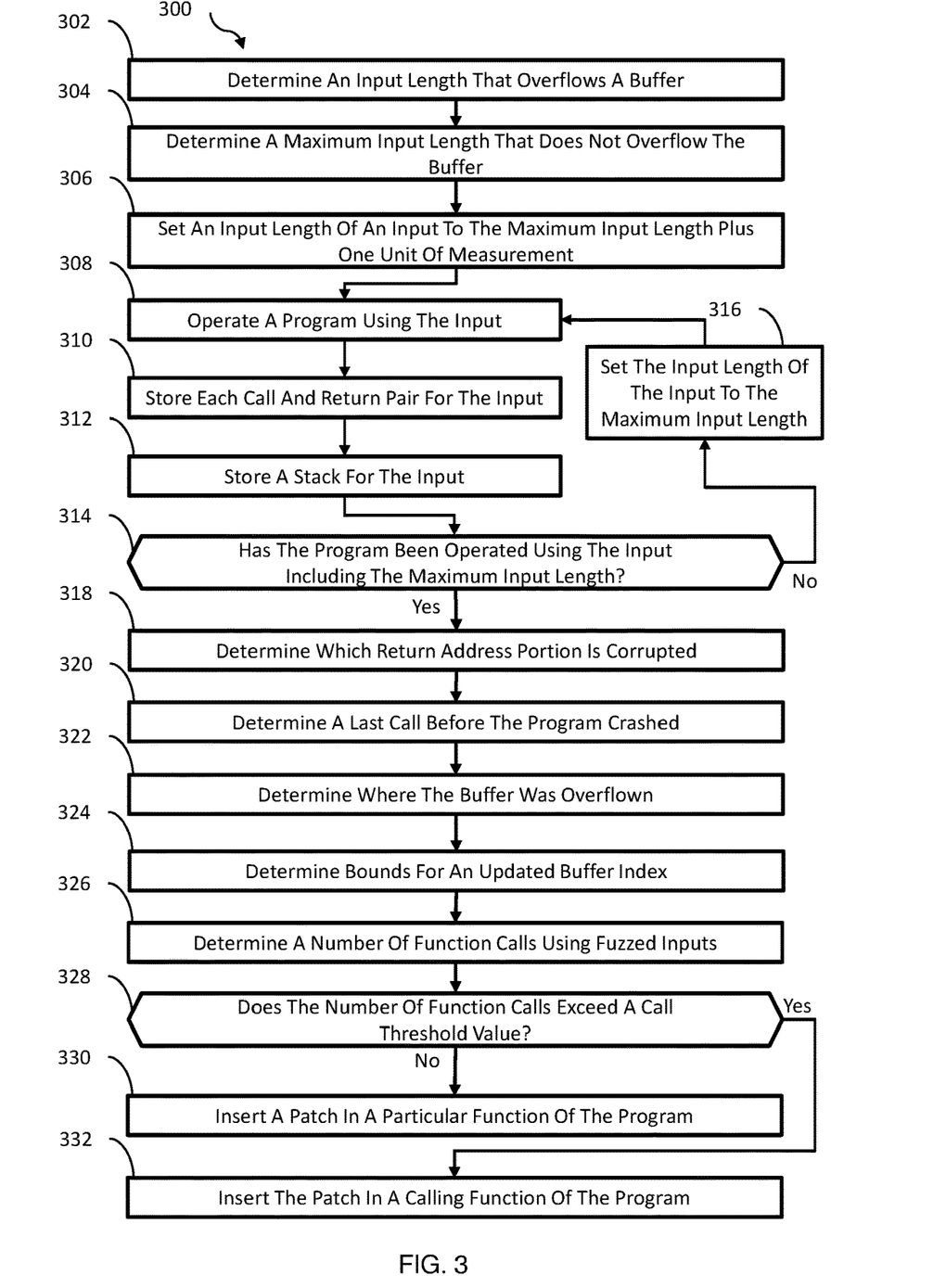
FIG. 3 illustrates a flow diagram of an example method related to automatically detecting buffer overflow and patching a function that causes the buffer overflow.
Figure 4:
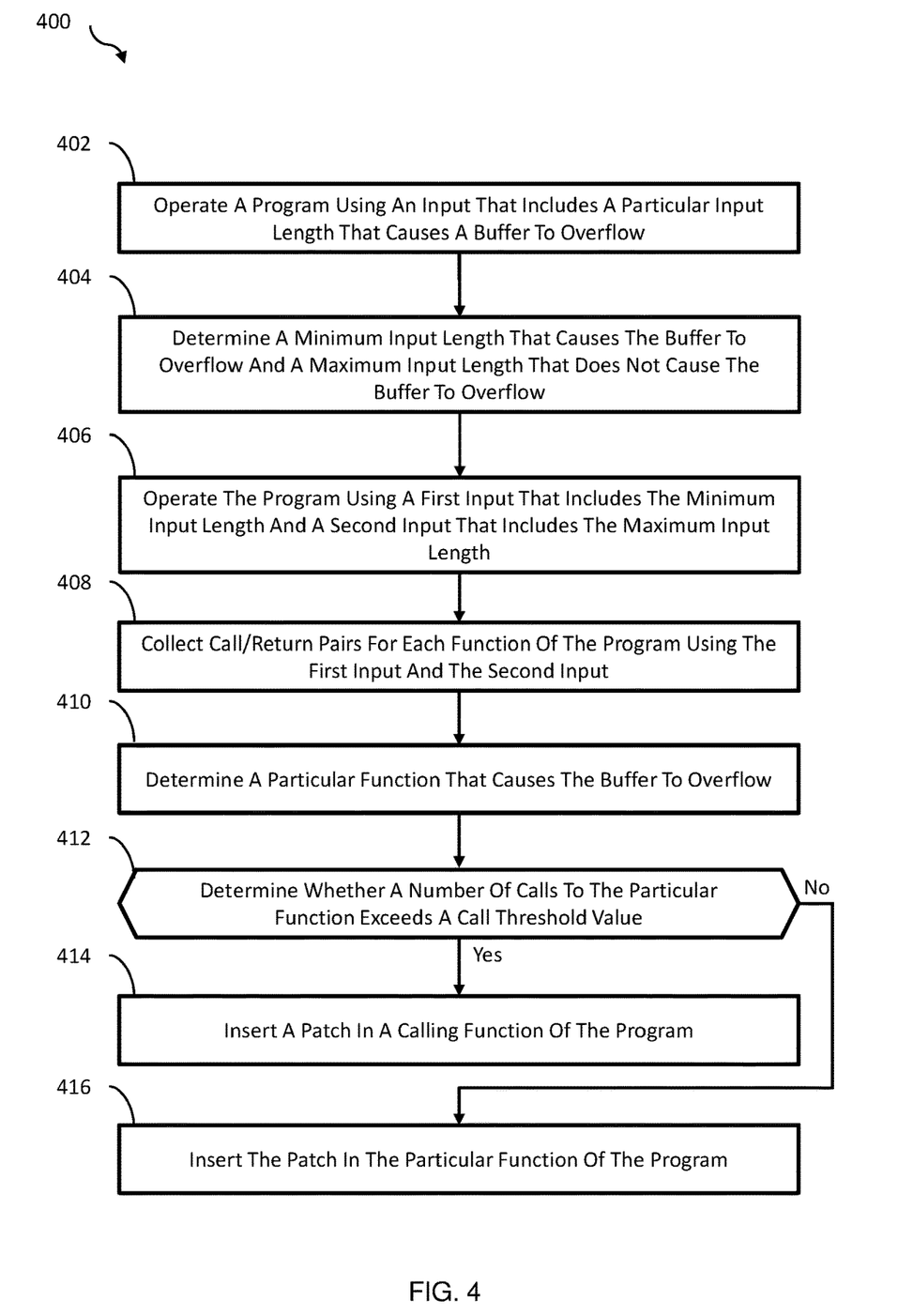
FIG. 4 illustrates a flow diagram of another example method related to automatically detecting buffer overflow and patching a function that causes the buffer overflow.

FIGS. 3 and 4 illustrate flow diagrams of example methods. The methods may be performed by processing logic that may include hardware (circuitry, dedicated logic, etc.), software (such as is run on a general purpose computer system or a dedicated machine), or a combination of both. The processing logic may be included in the computing device 103, the ODM 106, and/or the patch module 108 of FIG. 1, or another computer system or device. However, another system, or a combination of systems, may be used to perform the methods. For simplicity of explanation, methods described in the present disclosure are depicted and described as a series of acts. However, acts in accordance with this disclosure may occur in various orders and/or concurrently, and with other acts not presented and described in the present disclosure. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring of such methods to computing devices. The term article of manufacture, as used in the present disclosure, is intended to encompass a computer program accessible from any computer-readable device or storage media. Although illustrated as discrete blocks, various blocks may be divided into additional blocks, combined into fewer blocks, or eliminated, depending on the desired implementation.

FIG. 3 illustrates a flow diagram of an example method 300 related to automatically detecting buffer overflow and patching a function that causes the buffer overflow, in accordance with at least one embodiment described in the present disclosure. The method 300 may begin at block 302 ("Determine An Input Length That Overflows A Buffer"), where the processing logic may determine an input length that overflows a buffer. The input length may be measured by a number of digits, types of digits, values associated with the digits, number of bits, number of bytes, or any other appropriate unit of measurement. In some embodiments, an ODM may monitor a buffer and/or a program to determine whether an overflow has occurred, such as the ODM 106 and/or the program 104 of FIG. 1. Block 302 may be followed by block 304.

In block 304 ("Determine A Maximum Input Length That Does Not Overflow The Buffer"), the processing logic may determine a maximum input length that does not overflow the buffer. In some embodiments, the ODM may determine the maximum input length by performing binary search on the input length that overflows the buffer or any other appropriate method. Block 304 may be followed by block 306.

At block 306 ("Set An Input Length Of An Input To The Maximum Input Length Plus One Unit Of Measurement"), the processing logic may set an input length of an input to the maximum input length plus one unit of measurement (e.g., a minimum input length that overflows the buffer) as discussed above in relation to FIG. 1. In some embodiments, the ODM may set the input length of the input to the maximum input length plus one unit of measurement. Block 306 may be followed by block 308.

In block 308 ("Operate A Program Using The Input"), the processing logic may operate a program using the input. In some embodiments, the ODM may operate the program using the input as discussed above in relation to FIG. 1. Block 308 may be followed by block 310.

In block 310 ("Store Each Call And Return Pair For The Input"), the processing logic may store each call and return pair for the input. The call and return pairs (e.g., call/return pairs) may be generated during operation of the program. In some embodiments, the ODM may collect and store each of the call return pairs in memory, such as the memory 105 of FIG. 1. Block 310 may be followed by block 312.

In block 312 ("Store A Stack For The Input"), the processing logic may store a stack for the input. The stack may include allocation of memory associated with the input. For example, data generated during operation of the program may be stored in buffers. In some embodiments, the ODM may collect and store the stack for the input in memory as discussed above in relation to FIG. 1. Block 312 may be followed by block 314.

In block 314 ("Has The Program Been Operated Using The Input Including The Maximum Input Length?"), the processing logic may determine whether the program has been operated using the input including the maximum input length. If the program has not been operated using the input including the maximum input length, block 314 may be followed by block 316. If the program has been operated using the input including the maximum input length, block 314 may be followed by block 318.

In block 316 ("Set The Input Length Of The Input To The Maximum Input Length"), the processing logic may set the input length of the input to the maximum input length. In some embodiments, the ODM may set the input length of the input to the maximum input length as discussed above in relation to FIG. 1. Block 316 may be followed by block 308. The processing logic may repeat the process of blocks 308, 310, and/or 312 using the input including the maximum input length.

In block 318 ("Determine Which Return Address Portion Is Corrupted"), the processing logic may determine which return address portion is corrupted. In some embodiments, the ODM may determine which the return address portion is corrupted by comparing the stack corresponding to the input including the minimum input length to the stack corresponding to the input including the maximum input as discussed above in relation to FIG. 1. A difference between the two stacks may indicate where the return address portion is located. Block 318 may be followed by block 320.

In block 320 ("Determine A Last Call Before The Program Crashed"), the processing logic may determine a last call before the program crashed. In some embodiments, the ODM may determine the last call by comparing the call and return pairs corresponding to the input including the minimum input length to the call and return pairs corresponding to the input including the maximum input length as discussed above in relation to FIG. 1. A difference between the call and return pairs may indicate which function (e.g., a particular function) caused the buffer to overflow. Block 320 may be followed by block 322.

In block 322 ("Determine Where The Buffer Was Overflown"), the processing logic may determine where the buffer was overflown. Where the buffer was overflown may correspond to a bound that when exceeded corrupts the return address portion. In some embodiments, the ODM may determine where the buffer was overflown by comparing the two stacks as discussed above in relation to FIG. 1. Block 322 may be followed by block 324.

In block 324 ("Determine Bounds For An Updated Buffer Index"), the processing logic may determine bounds for an updated buffer index. In some embodiments, a difference between the two stacks may correspond to a first position of the return address. For example, positions zero through nineteen of the two stacks may be the same or similar and position twenty may be different. Based on this difference, the buffer may be determined to end at position nineteen and the bound may be at position nineteen. In some embodiments, the ODM may determine the bounds for the updated buffer index as discussed above in relation to FIG. 1. Block 324 may be followed by block 326.

In block 326 ("Determine A Number Of Function Calls Using Fuzzed Inputs"), the processing logic may determine a number of function calls using fuzzed inputs. In some embodiments, a patch module, such as the patch module 108 of FIG. 1, may determine a number of function calls using fuzzed inputs as discussed above in relation to FIG. 1. Block 326 may be followed by block 328.

In block 328 ("Does The Number Of Function Calls Exceed A Call Threshold Value?"), the processing logic may determine whether the number of function calls exceed a call threshold value. In some embodiments, the call threshold value may be determined based on user input or calculations as discussed above in relation to FIG. 1. If the number of function calls exceed the call threshold value, block 328 may be followed by block 332. If the number of function calls does not exceed the call threshold value, block 328 may be followed by block 330.

In block 330 ("Insert A Patch In A Particular Function Of The Program"), the processing logic may insert a patch in a particular function of the program. In some embodiments, the patch module may generate the patch in assembly language. In these and other embodiments, the patch module may insert the patch in assembly language corresponding to the particular function that caused the buffer to overflow. Alternatively, the patch module may generate the patch in intermediate representation and the patch may be inserted intermediate representation corresponding to the particular function. Inserting the patch in the particular function may reduce and/or prevent the particular function from overflowing the buffer when called by other functions.

In block 332 ("Insert The Patch In A Calling Function Of The Program"), the processing logic may insert the patch in a calling function of the program. In some embodiments, the patch module may insert the patch in assembly language corresponding to the calling function that called the particular function that causes the program to overflow. Inserting the patch in the calling function may reduce and/or prevent the particular function from overflowing the buffer only when called by the calling function. Alternatively, the patch module may generate the patch in intermediate representation and the patch may be inserted in the intermediate representation corresponding to the particular function.

FIG. 4 illustrates a flow diagram of another example method 400 related to automatically detecting buffer overflow and patching a function that causes the buffer overflow, in accordance with at least one embodiment described in the present disclosure. The method 400 may begin at block 402 ("Operate A Program Using An Input That Includes A Particular Input Length That Causes A Buffer To Overflow"), where the processing logic may operate a program using an input that includes a particular input length that causes a buffer to overflow. The input length may be measured by a number of digits, types of digits, values associated with the digits, number of bits, number of bytes, or any other appropriate unit of measurement. In some embodiments, an ODM may monitor a buffer and/or a program to determine whether an overflow has occurred, such as the ODM 106 and/or the program 104 of FIG. 1. Block 402 may be followed by block 404.

In block 404 ("Determine A Minimum Input Length That Causes The Buffer To Overflow And A Maximum Input Length That Does Not Cause The Buffer To Overflow"), the processing logic may determine a minimum input length that causes the buffer to overflow and a maximum input length that does not cause the buffer to overflow. In some embodiments, the ODM may determine the maximum input length by performing binary search on the particular input length that overflows the buffer or any other appropriate method. In these and other embodiments, the ODM may determine the minimum input length by incrementing the maximum input length plus one unit of measurement as discussed above in relation to FIG. 1. Block 404 may be followed by block 406.

At block 406 ("Operate The Program Using A First Input That Includes The Minimum Input Length And A Second Input That Includes The Maximum Input Length"), the processing logic may operate the program using a first input that includes the minimum input length and a second input that includes the maximum input length. Block 406 may be followed by block 408

In block 408 ("Collect Call/Return Pairs For Each Function Of The Program Using The First Input And The Second Input"), the processing logic may collect call/return pairs for each function of the program using the first input and the second input. The call/return pairs may be generated during operation of the program. In some embodiments, the ODM may collect and store the call/return pairs in memory, such as the memory 105 of FIG. 1. Block 408 may be followed by block 410.

In block 410 ("Determine A Particular Function That Causes The Buffer To Overflow"), the processing logic may determine a particular function that causes the buffer to overflow. In some embodiments, the particular function that causes the buffer to overflow may be determined based on a difference between the call/return pairs for the first input and the call/return pairs for the second input. The ODM may determine the particular function by comparing the call and return pairs corresponding to the input including the minimum input length to the call and return pairs corresponding to the input including the maximum input length as discussed above in relation to FIG. 1. Block 410 may be followed by block 412.

In block 412 ("Determine Whether A Number Of Calls To The Particular Function Exceeds A Call Threshold Value"), the processing logic may determine whether a number of calls to the particular function exceeds a call threshold value. In some embodiments, the call threshold value may be determined based on user input or calculations as discussed above in relation to FIG. 1. If the number of function calls exceeds the call threshold value, block 412 may be followed by block 414. If the number of function calls does not exceed the call threshold value, block 412 may be followed by block 416.

In block 414 ("Insert A Patch In A Calling Function Of The Program"), the processing logic may insert a patch in a calling function of the program. In some embodiments, the patch module may insert the patch in assembly language corresponding to the calling function that called the particular function that causes the program to overflow. Inserting the patch in the calling function may reduce and/or prevent the particular function from overflowing the buffer only when called by the calling function. Alternatively, the patch module may generate the patch in intermediate representation and the patch may be inserted intermediate representation corresponding to the calling function.

In block 416 ("Insert The Patch In A Particular Function Of The Program"), the processing logic may insert a patch in a particular function of the program. In some embodiments, the patch module may generate the patch in assembly language. In these and other embodiments, the patch module may insert the patch in assembly language corresponding to the particular function that caused the buffer to overflow. Alternatively, the patch module may generate the patch in intermediate representation and the patch may be inserted in the intermediate representation corresponding to the particular function. Inserting the patch in the particular function may reduce and/or prevent the particular function from overflowing the buffer when called by other functions.

Figure 5:
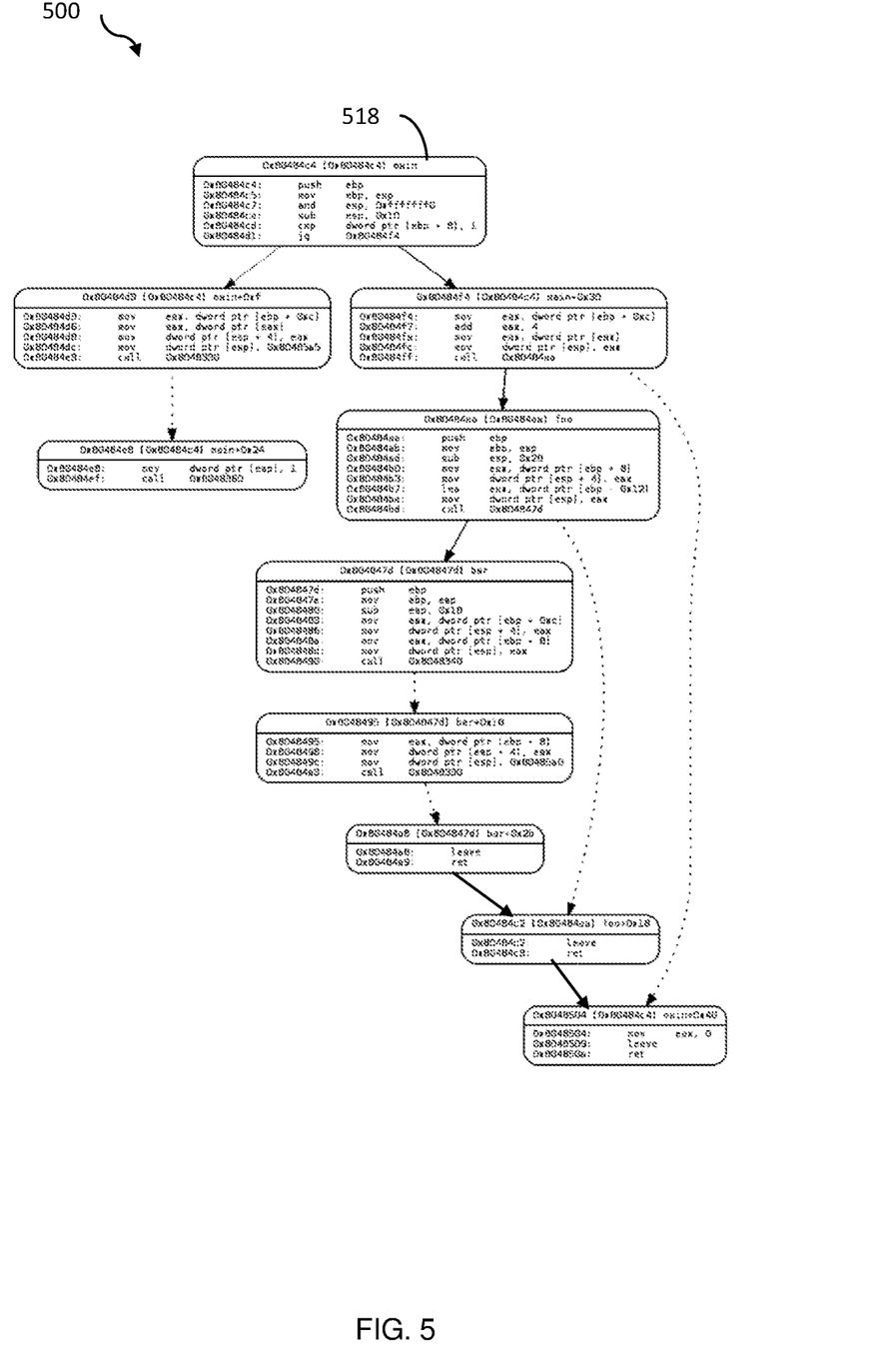
FIG. 5 illustrates a control flow graph of a program.

FIG. 5 illustrates a control flow graph 500 of a program, in accordance with at least one embodiment in the present disclosure. The control flow graph 500 may include multiple basic block nodes 518. In FIG. 5, a single basic block node 518 is numbered and described for simplicity of discussion.

In some embodiments, the control flow graph 500 be generated using standard techniques. For example, a program represented in machine code may be disassembled to assembly language using a disassembler. The disassembler may generate the control flow graph 500 to represent a path of functions in the program. Each of the basic block nodes 518 may include assembly code representative of a single function of the program. If a function of the program calls another function, the control flow graph 500 may include a connecting arrow between the basic block nodes 518. The arrows may indicate a path between the functions exists. For example, the basic block node 518 may be connected to two other basic block nodes. In the example illustrated in FIG. 5, a solid arrow may represent a call from a basic block node (e.g., an execution order of the basic block nodes (functions)) and a dashed arrow may represent a return from a basic block node (e.g., a code sequence as laid out in a memory). In some embodiments, a call to a library function that is not part of the actual program may also be represented as a dashed arrow. In these and other embodiments, the library function may be operated (e.g., executed), and the return from that library function may resume the flow from the dashed line. For example, a bar( ) node may call a strcmp( ) node, after which the bar( ) node may resume and subsequently may call a printf( ) node and again the bar( ) node may resume after the printf( ) node.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:
1. A system, comprising:
a memory including instructions; and
a processor operatively coupled to the memory, the processor configured to execute the instructions to cause the system to perform operations comprising:

obtain a binary program that is vulnerable to cause a buffer to overflow when the binary program is executed with an input that is at least as long as a minimum input length;

determine the minimum input length that causes the buffer to overflow;

determine a maximum input length that does not cause the buffer to overflow;

execute the binary program using a first input having the maximum input length;

execute the binary program using a second input having the minimum input length to cause the buffer to overflow;

collect first call/return pairs for a first plurality of functions of the binary program executed during the execution of the binary program using the first input;

collect second call/return pairs for a second plurality of functions of the binary program executed during the execution of the binary program using the second input;

determine, based on a difference between the first call/return pairs for the first input and the second call/return pairs for the second input, a particular function that causes the buffer to overflow; and determine whether a number of calls to the particular function from other functions of the binary program exceeds a call threshold value; and in response to the number of calls to the particular function exceeding the call threshold value, insert a patch in a calling function of the binary program that calls the particular function, the patch including a bound configured to prevent the particular function, when called by the calling function, from causing the buffer to overflow.

2. The system of claim 1, wherein the operations further comprise in response to the number of calls to the particular function from other functions of the binary program not exceeding the call threshold value, insert the patch in the particular function of the binary program.

3. The system of claim 1, wherein the operation of determine, based on the difference between the first call/return pairs and the second call/return pairs, the particular function that causes the buffer to overflow comprises:

determine a first function-call sequence of the binary program corresponding to the first input; and determine a second function-call sequence of the binary program corresponding to the second input, wherein the particular function is determined based on a difference between the first function-call sequence and the second function-call sequence second input.

4. The system of claim 1, wherein the operations further comprise:

analyze a first allocation of memory in a first stack corresponding to the first input;

analyze a second allocation of memory in a second stack corresponding to the second input;

compare the first allocation to the second allocation; and determine, based on the comparison of the first allocation to the second allocation, a return address that was corrupted.

5. The system of claim 4, the operations further comprising:

determine stack locations that correspond to the buffer;

determine stack locations that correspond to the return address; and generate the patch, wherein the bound configured to prevent the particular function from causing the buffer to overflow is based on the stack locations that correspond to the buffer and the stack locations that correspond to the return address.

6. The system of claim 1, wherein the operations further comprise:

generate a plurality of fuzzed inputs based on the first input;

execute the binary program a plurality of times, each execution using a different one of the plurality of fuzzed inputs; and based on the plurality of executions of the binary program, determine the number of calls to the particular function from the other functions of the binary program.

7. The system of claim 1, wherein the operations further comprise insert the patch in at least one of assembly language and intermediate representation corresponding to the particular function or the calling function.

8. A method, comprising:

obtaining a binary program that is vulnerable to cause a buffer to overflow when the binary program is executed with an input that is at least as long as a minimum input length;

determining the minimum input length that causes the buffer to overflow;

determining a maximum input length that does not cause the buffer to overflow;

executing the binary program using a first input having the maximum input length;

executing the binary program using a second input having the minimum input length to cause the buffer to overflow;

collecting first call/return pairs for a first plurality of functions of the binary program executed during the execution of the binary program using the first input;

collecting second call/return pairs for a second plurality of functions of the binary program executed during the execution of the binary program using the second input;

determining, based on a difference between the first call/return pairs and the second call/return pairs, a particular function that causes the buffer to overflow; and determining whether a number of calls to the particular function from other functions of the binary program exceeds a call threshold value; and in response to the number of calls to the particular function exceeding the call threshold value, insert a patch in a calling function of the binary program that calls the particular function, the patch including a bound configured to prevent the particular function, when called by the calling function, from causing the buffer to overflow.

9. The method of claim 8, wherein the maximum input length is determined using binary search and the minimum input length is equal to the maximum input length plus one unit of measurement.

10. The method of claim 8, wherein determining, based on the difference between the first call/return pairs and the second call/return pairs, the particular function that causes the buffer to overflow comprises:

determining a first function-call sequence of the binary program corresponding to the first input; and determining a second function-call sequence of the binary program corresponding to the second input, wherein the particular function is determined based on a difference between the first function-call sequence and the second function-call sequence.

11. The method of claim 8, further comprising:
analyzing a first allocation of memory in a first stack corresponding to the first input;
analyzing a second allocation of memory in a second stack corresponding to the second input;
comparing the first allocation to the second allocation; and
determining, based on the comparison of the first allocation to the second allocation, a return address that was corrupted.

12. The method of claim 11, further comprising:
determining stack locations that correspond to the buffer;
determining stack locations that correspond to the return address; and
generating the patch, wherein the bound configured to prevent the particular function from causing the buffer to overflow is based on the stack locations that correspond to the buffer and the stack locations that correspond to the return address.

13. The method of claim 8, further comprising:
generating a plurality of fuzzed inputs based on the first input;
executing the binary program a plurality of times, each execution using a different one of the plurality of fuzzed inputs; and
based on the plurality of executions of the binary program, determining the number of calls to the particular function from other functions of the binary program using.

14. The method of claim 8, wherein inserting the patch in the particular function comprises lifting the particular function to intermediate representation and the patch is inserted in the intermediate representation corresponding to the particular function.

15. A non-transitory computer-readable medium having encoded therein, programming code executable by a processor to cause a system to perform operations comprising:
obtaining a binary program that is vulnerable to cause a buffer to overflow when the binary program is executed with an input that is at least as long as a minimum input length
determining the minimum input length that causes the buffer to overflow;
determining a maximum input length that does not cause the buffer to overflow;
executing the binary program using a first input having the maximum input length;
executing the binary program using a second input having the minimum input length to cause the buffer to overflow;
collecting first call/return pairs for a first plurality of functions of the binary program executed during the execution of the binary program using the first input;
collecting second call/return pairs for a second plurality of functions of the binary program executed during the execution of the binary program using the second input;
determining, based on a difference between the first call/return pairs and the second call/return pairs, a particular function that causes the buffer to overflow;
determining whether a number of calls to the particular function from other functions of the binary program exceeds a call threshold value; and
in response to the number of calls to the particular function exceeding the call threshold value, insert a patch in a calling function of the binary program that calls the particular function, the patch including a bound configured to prevent the particular function, when called by the calling function, from causing the buffer to overflow.

16. The non-transitory computer-readable medium of claim 15, wherein determining, based on the difference between the first call/return pairs and the second call/return pairs, the particular function that causes the buffer to overflow comprises:
determining a first function-call sequence of the program corresponding to the first input; and
determining a second function-call sequence of the program corresponding to the second input,
wherein the particular function is determined based on a difference between the first function-call sequence and the second function-call sequence.

17. The non-transitory computer-readable medium of claim 15, wherein the operations further comprise:
analyzing a first allocation of memory in a first stack corresponding to the first input;
analyzing a second allocation of memory in a second stack corresponding to the second input;
comparing the first allocation to the second allocation; and
determining, based on the comparison of the first allocation to the second allocation, a return address that was corrupted.

18. The non-transitory computer-readable medium of claim 17, wherein the operations further comprise:
determining stack locations that correspond to the buffer;
determining stack locations that correspond to the return address; and
generating the patch, wherein the bound configured to prevent the particular function from causing the buffer to overflow is based on the stack locations that correspond to the buffer and the stack locations that correspond to the return address.

19. The non-transitory computer-readable medium of claim 15, wherein the operations further comprise:
generating a plurality of fuzzed inputs based on the first input;
executing the binary program a plurality of times, each execution using a different one of the plurality of fuzzed inputs; and
based on the plurality of executions of the binary program, determining the number of calls to the particular function from the other functions of the binary program.

20. The non-transitory computer-readable medium of claim 15, wherein inserting the patch in the particular function comprises lifting the particular function to intermediate representation and the patch is inserted in the intermediate representation corresponding to the particular function.

* * * * *